(12) United States Patent
Jang et al.

(10) Patent No.: US 7,722,981 B2
(45) Date of Patent: May 25, 2010

(54) ELECTRO-CATALYST COMPOSITION, FUEL CELL ELECTRODE, AND MEMBRANE-ELECTRODE ASSEMBLY

(75) Inventors: Bor Z. Jang, Centerville, OH (US); Aruna Zhamu, Centerville, OH (US); Jiusheng Guo, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 454 days.

(21) Appl. No.: 11/518,565

(22) Filed: Sep. 11, 2006

(65) Prior Publication Data

US 2008/0063922 A1 Mar. 13, 2008

(51) Int. Cl.
*H01M 4/00* (2006.01)
*H01B 1/24* (2006.01)

(52) U.S. Cl. .......................................... 429/44; 429/42
(58) Field of Classification Search .................. 429/42, 429/44; 252/511
See application file for complete search history.

(56) References Cited

U.S. PATENT DOCUMENTS

| | | | |
|---|---|---|---|
| 4,876,115 A | 10/1989 | Raistrick | |
| 4,880,508 A | 11/1989 | Aldissi | |
| 5,109,070 A | 4/1992 | Epstein et al. | |
| 5,137,991 A | 8/1992 | Epstein et al. | |
| 5,211,984 A | 5/1993 | Wilson | |
| 5,432,023 A * | 7/1995 | Yamada et al. | 429/34 |
| 5,589,108 A | 12/1996 | Shimizu et al. | |
| 5,648,453 A | 7/1997 | Saida et al. | |
| 5,677,074 A | 10/1997 | Serpico et al. | |
| 5,846,670 A | 12/1998 | Watanabe et al. | |
| 6,015,635 A | 1/2000 | Kawahara | |
| 6,074,773 A | 6/2000 | Wilkinson et al. | |
| 6,187,467 B1 | 2/2001 | Zhang et al. | |
| 6,344,291 B1 | 2/2002 | Hitomi | |
| 6,492,295 B2 | 12/2002 | Hitomi | |

FOREIGN PATENT DOCUMENTS

JP 11162468 * 6/1999

* cited by examiner

*Primary Examiner*—Patrick Ryan
*Assistant Examiner*—Thomas H. Parsons (57) ABSTRACT

Disclosed are an electro-catalyst composition and a precursor electro-catalyst composition (e.g., ink or suspension) for use in a fuel cell that exhibits improved power output. The electro-catalyst composition comprises: (a) a catalyst un-supported or supported on an electronically conducting carrier (e.g., carbon black particles); and (b) an ion-conducting and electron-conducting coating material in physical contact with the catalyst and/or coated on a surface of the carrier, wherein the coating material has an electronic conductivity no less than $10^{-4}$ S/cm (preferably no less than $10^{-2}$ S/cm) and an ion conductivity no less than $10^{-5}$ S/cm (preferably no less than $10^{-3}$ S/cm). Also disclosed are a fuel cell electrode comprising this composition, a membrane-electrode assembly (MEA) comprising this composition, and a fuel cell comprising this composition.

20 Claims, 7 Drawing Sheets

FIG.6 Fuel cells featuring different catalysts, one with a proton- and electron-conductive coating (diamond) and the other with Nafion coating.

FIG.7 Fuel cells featuring different catalysts, one with a sulfonated polyaniline coating (diamond) and the other with Nafion coating.

ELECTRO-CATALYST COMPOSITION, FUEL CELL ELECTRODE, AND MEMBRANE-ELECTRODE ASSEMBLY

FIELD OF THE INVENTION

This invention relates to an electro-catalyst composition for use in a fuel cell electrode. In particular, it relates to an electro-catalyst composition for use in proton exchange membrane-type fuel cells.

BACKGROUND OF THE INVENTION

The proton exchange membrane or polymer electrolyte membrane fuel cell (PEM-FC) has been a topic of highly active R&D efforts during the past two decades. The operation of a fuel cell normally requires the presence of an electrolyte and two electrodes, each comprising a certain amount of catalysts, hereinafter referred to as electro-catalysts. A hydrogen-oxygen PEM-FC uses hydrogen or hydrogen-rich reformed gases as the fuel while a direct-methanol fuel cell (DMFC) uses methanol solution as the fuel. The PEM-FC and DMFC, or other direct organic fuel cells, are collectively referred to as the PEM-type fuel cell.

A PEM-type fuel cell is typically composed of a seven-layered structure, including a central polymer electrolyte membrane for proton transport, two electro-catalyst layers on the two opposite sides of the electrolyte membrane in which chemical reactions occur, two gas diffusion layers (GDLs) or backing layers stacked on the corresponding electro-catalyst layers (each GDL comprising porous carbon paper or cloth through which reactants and reaction products diffuse in and out of the cell), and two flow field plates stacked on the GDLs. The flow field plates (also commonly referred to as bipolar plates) are typically made of carbon, metal, or composite graphite fiber plates. The bipolar plates also serve as current collectors. Gas-guiding channels are defined on a GDL facing a flow field plate, or on a flow field plate surface facing a GDL. Reactants and reaction products (e.g., water) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling and humidifying means may be added to assist in the operation of a fuel cell stack.

Several of the above-described seven layers may be integrated into a compact assembly, e.g., the membrane-electrode assembly (MEA). The MEA typically includes a selectively permeable polymer electrolyte membrane bonded between two electrodes (an anode and a cathode). A commonly used PEM is poly (perfluoro sulfonic acid) (e.g., Nafion® from du Pont Co.), its derivative, copolymer, or mixture. Each electrode typically comprises a catalyst backing layer (e.g., carbon paper) and an electro-catalyst layer disposed between a PEM layer and the catalyst backing layer. Hence, in actuality, an MEA may be composed of five layers: two catalyst backing, two electro-catalyst layers, and one PEM layer interposed between the two electro-catalyst layers. Most typically, the two electro-catalyst layers are coated onto the two opposing surfaces of a PEM layer to form a catalyst-coated membrane (CCM). The CCM is then pressed between a carbon paper layer (the anode backing layer) and another carbon paper layer (the cathode backing layer) to form an MEA. It may be noted that, some workers in the field of fuel cells refer a CCM as an MEA. Commonly used electro-catalysts include noble metals (e.g., Pt), rare-earth metals (e.g., Ru), and their alloys. Known processes for fabricating high performance MEAs involve painting, spraying, screen-printing and hot-bonding catalyst layers onto the electrolyte membrane and/or the catalyst backing layers.

An electro-catalyst is needed to induce the desired electrochemical reactions at the electrodes or, more precisely, at the electrode-electrolyte interfaces. The electro-catalyst may be a metal black, an alloy or a supported metal catalyst, for example, platinum supported on carbon. In real practice, an electro-catalyst can be incorporated at the electrode-electrolyte interfaces in PEM fuel cells by applying it in a layer on either an electrode substrate (e.g., a surface of a carbon paper-based backing layer) or a surface of the membrane electrolyte. In the former case, electro-catalyst particles are typically mixed with a liquid to form a slurry or ink, which is then applied to the electrode substrate. While the slurry preferably wets the substrate surface to some extent, it must not penetrate too deeply into the substrate, otherwise some of the catalyst will not be located at the desired membrane-electrode interface. In the latter case, electro-catalyst particles are coated onto the two primary surfaces of a membrane to form a catalyst-coated membrane (CCM).

Electro-catalyst sites must be accessible to the reactants (e.g., hydrogen on the anode side and oxygen on the cathode side), electrically connected to the current collectors, and ionically connected to the electrolyte membrane layer. Specifically, electrons and protons are typically generated at the anode electro-catalyst. The electrons generated must find a path (e.g., the backing layer and a current collector) through which they can be transported to an external electric circuit. The protons generated at the anode electro-catalyst must be quickly transferred to the electrolyte (PEM) through which they migrate to the cathode. Electro-catalyst sites are not productively utilized if the protons do not have a means for being quickly transported to the ion-conducting electrolyte. For this reason, coating the exterior surfaces of the electro-catalyst particles and/or electrode backing layer (carbon paper or fabric) with a thin layer of an ion-conductive ionomer has been used to increase the utilization of electro-catalyst exterior surface area and increase fuel cell performance by providing improved ion-conducting paths between the electro-catalyst surface sites and the electrolyte membrane. Such an ion-conductive ionomer is typically the same material used as the PEM in the fuel cell. An ionomer is an ion-conducting polymer, which can be of low, medium or high molecular weight. For the case of a PEM fuel cell, the conducting ion is the proton and the ionomer is a proton-conducting polymer. The ionomer can be incorporated in the catalyst ink or can be applied on the catalyst-coated substrate afterwards. This approach has been followed by several groups of researchers, as summarized in the following patents:

1) D. P. Wilkinson, et al., "Impregnation of micro-porous electro-catalyst particles for improving performance in an electrochemical fuel cell," U.S. Pat. No. 6,074,773 (Jun. 13, 2000).
2) J. Zhang, et al., "Ionomer impregnation of electrode substrate for improved fuel cell performance," U.S. Pat. No. 6,187,467 (Feb. 13, 2001).
3) I. D. Raistrick, "Electrode assembly for use in a solid polymer electrolyte fuel cell," U.S. Pat. No. 4,876,115 (Oct. 24, 1989).
4) M. S. Wilson, "Membrane catalyst layer for fuel cells," U.S. Pat. No. 5,211,984 (May 18, 1993).
5) J. M. Serpico, et al., "Gas diffusion electrode," U.S. Pat. No. 5,677,074 (Oct. 14, 1997).

6) M. Watanabe, et al., "Gas diffusion electrode for electrochemical cell and process of preparing same," U.S. Pat. No. 5,846,670 (Dec. 8, 1998).
7) T. Kawahara, "Electrode for fuel cell and method of manufacturing electrode for fuel cell," U.S. Pat. No. 6,015,635 (Jan. 18, 2000).
8) S. Hitomi, "Solid polymer electrolyte-catalyst composite electrode, electrode for fuel cell, and process for producing these electrodes," U.S. Pat. No. 6,344,291 (Feb. 5, 2002).
9) S. Hitomi, et al. "Composite catalyst for solid polymer electrolyte-type fuel cell and process for producing the same," U.S. Pat. No. 6,492,295 (Dec. 10, 2002).

However, this prior-art approach of ionomer impregnation into the electrode layer and/or onto electro-catalyst particle surfaces has a serious drawback in that the ionomer, although ion-conducting (proton-conducting), is not electronically conducting. This is due to the consideration that a proton-exchange membrane, when serving as the solid electrolyte layer, cannot be an electronic conductor; otherwise, there would be internal short-circuiting, resulting in fuel cell failure and possible fire hazard. Such an electronically non-conductive material, when coated onto the surface of a catalyst particle or carbon paper fiber, will render the catalyst particle or carbon fiber surface electronically non-conductive. This would prevent the electrons generated at the catalyst sites from being quickly collected by the anode electrode substrate layer and the current collector, thereby significantly increasing the Ohmic resistance and reducing the fuel cell performance.

A measure of the fuel cell performance is the voltage output from the cell for a given current density. Higher performance is associated with a higher voltage output for a given current density or higher current density for a given voltage output. More effective utilization of the electro-catalyst, particularly through optimizing the electron and ion transfer rates, enables the same amount of electro-catalyst to induce a higher rate of electrochemical conversion in a fuel cell resulting in improved performance. This was the main object of the present invention.

SUMMARY OF THE INVENTION

The present invention provides an electro-catalyst composition for use in a fuel cell. The composition comprises (a) a catalyst un-supported or supported on an electronically conducting solid carrier; and (b) an ion-conductive and electron-conductive coating material in physical contact with the catalyst, coated on the catalyst, and/or coated on a surface of the carrier, wherein the coating material has an electronic conductivity no less than $10^{-4}$ S/cm and ion conductivity no less than $10^{-5}$ S/cm. Preferably, the electronic conductivity is no less than $10^{-2}$ S/cm and the ion proton conductivity is no less than $10^{-3}$ S/cm. The catalyst may be selected from transition metals, alloys, mixtures, and oxides that can be made into nano-scaled particles that stand alone or are supported on a conducting material such as carbon black. The methods of producing commonly used fuel cell catalyst particles are well-known in the art.

Preferably, the coating material comprises a polymer which is an ion- and electron-conductive polymer or a mixture of a proton-conducting polymer and an electron-conducting polymer.

The proton-conducting polymer may selected from the group consisting of poly(perfluoro sulfonic acid), sulfonated polytetrafluoroethylene, sulfonated perfluoroalkoxy derivatives of polytetrafluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated polyvinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends and combinations thereof.

The electrically conducting polymer may comprise a polymer selected from the group consisting of sulfonated polyaniline, sulfonated polypyrrole, sulfonated poly thiophene, sulfonated bi-cyclic polymers, their derivatives, and combinations thereof. These polymers are themselves also good proton-conductive materials.

The present invention also provides a precursor electro-catalyst composition comprising: (a) a catalyst dissolved or dispersed in a liquid; and (b) an ion-conducting and electron-conducting polymer dissolved or dispersed in this liquid, wherein the electronic conductivity of the polymer, when measured in a solid state, is no less than $10^{-4}$ S/cm and the ion conductivity of the polymer, when measured in a solid state, is no less than $10^{-5}$ S/cm. The catalyst may be supported on conductive material particles such as carbon black. This precursor composition may be a suspension as thin as an ink (inkjet printable or sprayable) or as thick as a paste (can be screen-printed or brushed onto a carbon paper or PEM surface). When the liquid is removed (evaporated), the resulting solid catalyst is typically characterized in that the catalyst particles are embedded in, coated with, or impregnated with an ion- and electron-conductive polymer.

The incorporation of such an electro-catalyst composition in a fuel cell electrode, catalyst-coated membrane, or membrane electrode assembly leads to much improved fuel cell performance with much reduced Ohmic loss, higher catalyst utilization efficiency, and higher cell output voltage (given the same desired operating current density).

DETAILED DESCRIPTION OF THE PREFERRED EMBODIMENTS

A hydrogen-oxygen PEM-FC using hydrogen gas as the fuel and oxygen as the oxidant may be represented by the following electro-chemical reactions:

$$\text{Anode: } H_2 \rightarrow 2H^+ + 2e^- \quad (Eq.(1))$$

$$\text{Cathode: } \tfrac{1}{2}O_2 + 2H^+ + 2e^- \rightarrow H_2O \quad (Eq.(2))$$

$$\text{Total reaction: } H_2 + \tfrac{1}{2}O_2 \rightarrow H_2O \quad (Eq.(3))$$

Figure 1:
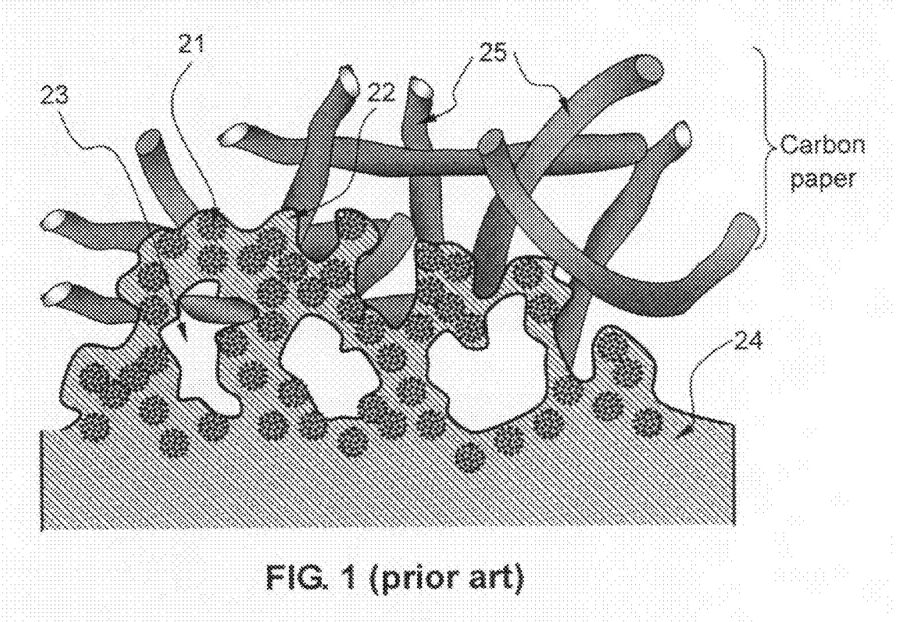
FIG. 1 Schematic of a prior-art PEM fuel cell electrode structure.

Both electrode reactions proceed only on a three-phase interface which allows the reception of gas (hydrogen or oxygen) and the delivery or reception of proton ($H^+$) and electron ($e^-$) at the same time. An example of the electrode having such a function is a solid polymer electrolyte-catalyst composite electrode comprising a solid polymer electrolyte and catalyst particles. FIG. 1 schematically shows the structure of such a prior art electrode. This electrode is a porous electrode comprising catalyst particles 21 and a solid polymer electrolyte 22 three-dimensionally distributed in admixture and having a plurality of pores 23 formed thereinside. The catalyst particles form an electron-conductive channel, the solid electrolyte forms a proton-conductive channel, and the pore forms a channel for the supply and discharge of oxygen, hydrogen or water as product. The three channels are three-dimensionally distributed and numerous three-phase interfaces which allow the reception or delivery of gas, proton ($H^+$) and electron ($e^-$) at the same time are formed in the electrode, providing sites for electrode reaction. In this diagram, reference numeral 24 represents an ion-exchange membrane (typically the same material as the solid polymer electrolyte 22) while numeral 25 represents carbon or graphite fibers in a sheet of carbon paper as a catalyst backing layer.

The preparation of an electrode having such a structure has heretofore been accomplished typically by a process that comprises (a) preparing a paste of catalyst particles and, optionally, poly tetrafluoroethylene (PTFE) particles dispersed in a liquid, (b) applying (dispensing, depositing, spraying, or coating) the paste to a surface of a PEM or a porous carbon electrode substrate (carbon paper) of an electro-conductive porous material to make a catalyst film (normally having a layer thickness of from 3 to 30 μm), (c) heating and drying the film, and (d) applying a solid polymer electrolyte solution to the catalyst film so that the film is impregnated with the electrolyte. Alternatively, the process comprises applying a paste made of catalyst particles, PTFE particles, and a solid polymer electrolyte solution to a PEM or a porous carbon electrode substrate to make a catalyst film and then heating and drying the film. The solid polymer electrolyte solution may be obtained by dissolving the same composition as the aforementioned ion-exchange membrane (PEM) in an alcohol. PTFE particles are typically supplied with in a solution with the particles dispersed therein. PTFE particles typically have a particle diameter of approximately 0.2-0.3 μm. Catalyst particles are typically Pt or Pt/Ru nano particles supported on carbon black particles.

Figure 2:
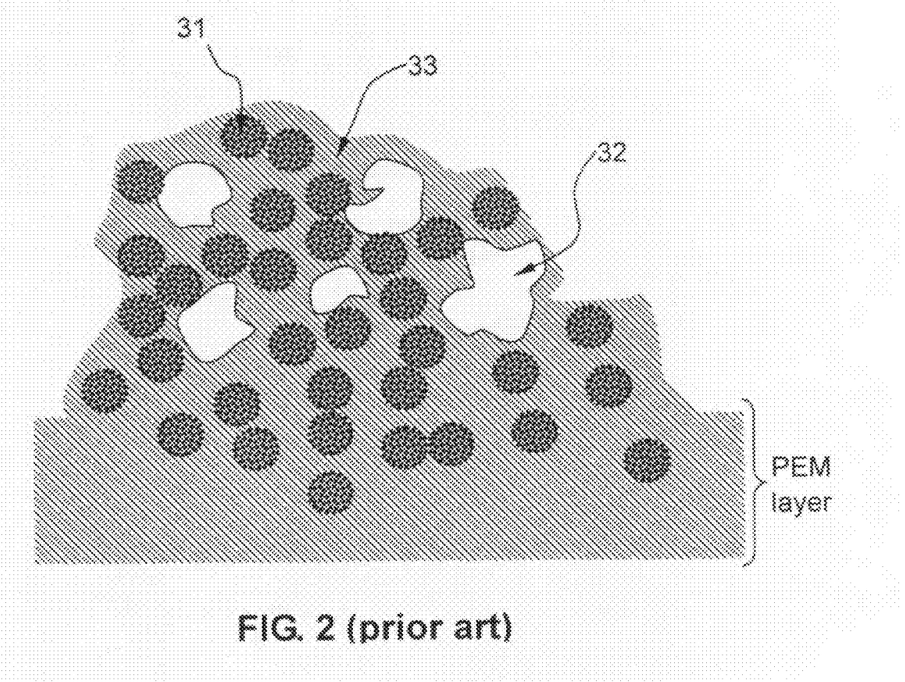
FIG. 2 Schematic of another prior-art PEM fuel cell electrode structure.

The aforementioned solid polymer electrolyte-catalyst composite electrode has the following drawbacks: The solid polymer electrolyte-catalyst composite electrode has a high electrical resistivity, which may be explained as follows. When catalyst particles are mixed with solid polymer electrolyte solution to prepare a paste, the catalyst particles are covered with solid polymer electrolyte film having extremely low electronic conductivity ($10^{-16}$-$10^{-13}$ S/cm). Upon completion of a film-making process to prepare an electrode, pores 32 and the non-conductive solid polymer electrolyte 33 tend to separate or isolate catalyst particles 31. The formation of a continuous catalyst particle passage (electron-conducting channel) is inhibited or interrupted, although a continuous solid electrolyte passage (proton-conducting channel) is maintained, as shown in the sectional view of electrode of FIG. 2.

Furthermore, by pressing the catalyst-electrolyte composite composition layer against the PEM layer to make a catalyst-coated membrane (CCM) or membrane electrode assembly (MEA), a significant amount of the carbon-supported catalyst particles tend to be embedded deep into the PEM layer (illustrated by the bottom portion of FIG. 2), making them inaccessible by electrons (if used as a cathode) or incapable of delivering electrons to the anode current collector (if used as an anode). As a result, the overall percent utilization of carbon-supported catalyst is significantly reduced.

Figure 3:
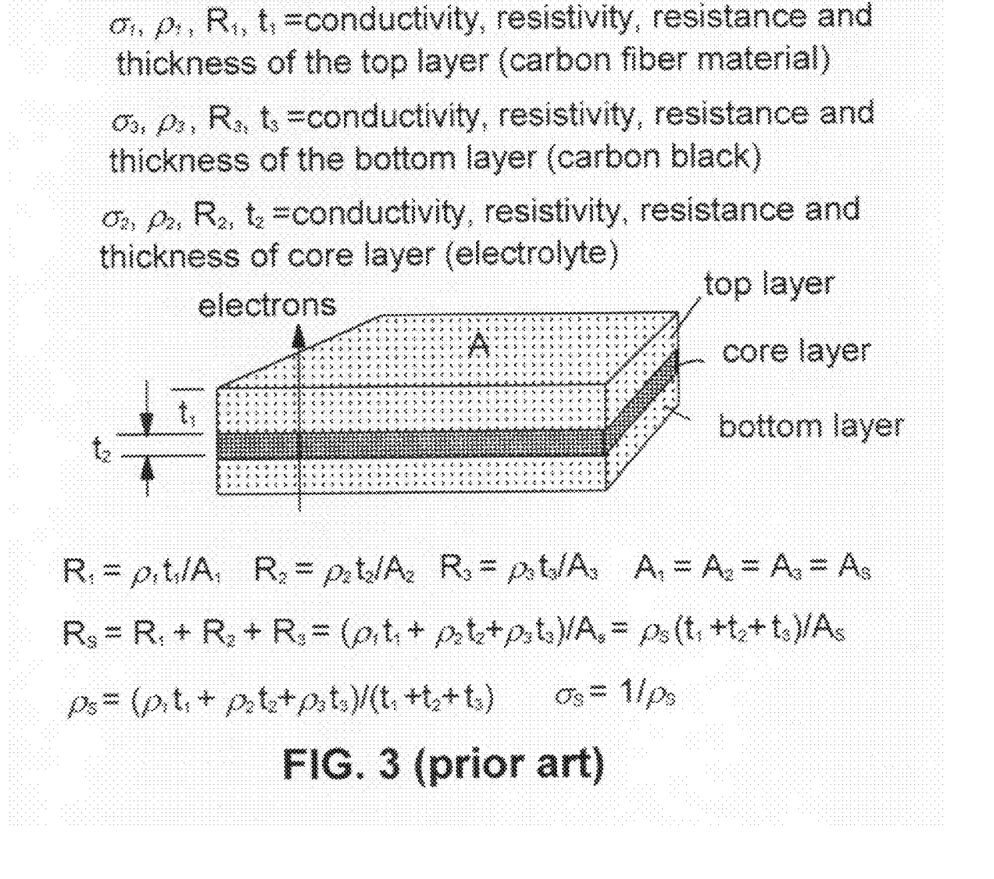
FIG. 3 A three-material model for a local catalyst-electrolyte-carbon fiber region in a prior-art fuel cell electrode.

As shown in the upper portion of FIG. 1, the electronically non-conducting solid electrolyte 22 also severs the connection between the otherwise highly conductive catalyst-supporting carbon particles 21 and the carbon fibers 25 in the electrode-catalyst backing layer (carbon paper). This problem of solid electrolyte being interposed between a carbon particle and a carbon fiber is very significant and has been largely ignored by fuel cell researchers. The degree of severity of this problem is best illustrated by considering a three-layer model shown in FIG. 3. The model consists of top, core, and bottom layers that are electrically connected in series. The top layer represents a carbon fiber material, the bottom layer a carbon black particle material, and the core layer a solid electrolyte material. The total resistance ($R_S$), equivalent resistivity ($\rho_s$), and conductivity ($\sigma_s$) of the three-layer model can be easily estimated. For the top layer (carbon fiber), the properties or parameters are given as follows: conductivity ($\sigma_1$), resistivity ($\rho_1$), resistance ($R_1$), and thickness ($t_1$). Similar notations are given for the other two layers with subscript being "2" and "3", respectively. FIG. 3 shows that the equivalent conductivity of the resulting three-layer model is $\sigma_s = (t_1 + t_2 + t_3)/(\rho_1 t_1 + \rho_2 t_2 + \rho_3 t_3)$. With $t_1 = 10$ μm, $t_2 = 1$ μm, and $t_3 = 30$ nm (0.03 μm), $\rho_1 = 10^{-1}$ Ωcm, $\rho_2 = 10^{+4}$ Ωcm, and $\rho_3 = 10^{+2}$ Ωcm, we have $\sigma_s \approx 10^{-13}$ S/cm. Assume that the electrolyte layer has a thickness as low as 1 nm (0.001 μm), the equivalent conductivity would be still as low as $\sigma_s \approx 10^{-10}$ S/cm. It is clear that the equivalent conductivity of the local electrode environment (three-component model) is dictated by the low conductivity or high resistivity of the solid electrolyte (22 in FIG. 1 and 33 in FIG. 2). These shockingly low conductivity values ($10^{-13}$ to $10^{-10}$ S/cm) clearly have been overlooked by all of the fuel cell researchers. It could lead to significant power loss (Ohmic resistance) in a fuel cell.

To effectively address the aforementioned issues associated with electro-catalysts in a fuel cell in general and a PEM-type fuel cell in particular, we decided to take a novel approach to the formulation of electro-catalysts. Rather than using the same solid electrolyte material as the PEM layer (which is ion-conductive but must be electronically non-conductive), we used a solid electrolyte material (that is both electron-conductive and ion-conductive) to coat, impregnate, and/or embed catalyst particles (which are un-supported or supported on conductive particles like carbon black). The solid electrolyte layer (e.g., PEM or other ion conductive solids, organic or inorganic) interposed between the anode and the cathode remained to be an ion-conductive (e.g., proton-conductive), but not electron-conductive.

Hence, one of the preferred embodiments of the present invention is an electro-catalyst composition comprising: (a) a catalyst un-supported or supported on an electronically conducting solid carrier (e.g., carbon black particles) and (b) an ion-conducting material in physical contact with the catalyst, coated on the catalyst, and/or coated on a surface of the carrier, wherein the ion-conducting material is also electronically conducting with an electronic conductivity no less than loss due to the high electronic conductivity of electrolyte material 44.

Figure 4:
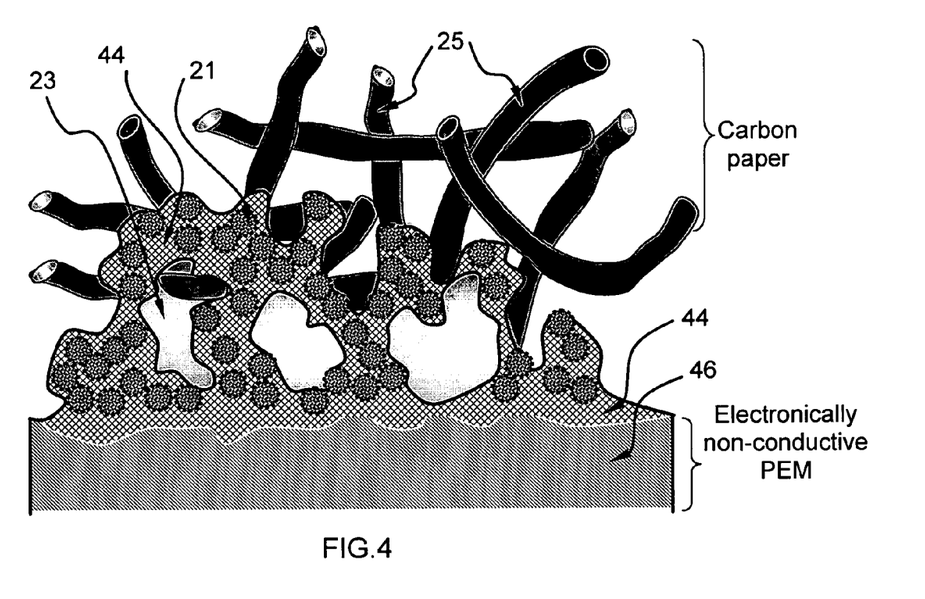
FIG. 4 Schematic of an electrode structure according to a preferred embodiment of the present invention.

In one preferred embodiment, the ion-conductive and electron-conductive coating material 44 comprises a polymer that is by itself both ion-conductive and electron-conductive. Examples of this type polymer are sulfonated polyaniline compositions, as described by Epstein, et al. (U.S. Pat. No. 5,137,991, Aug. 11, 1992):

(Formula I)

$10^{-4}$ S/cm (preferably no less than $10^{-2}$ S/cm) and ion (proton) conductivity no less than $10^{-5}$ S/cm (preferably no less than $19^{-3}$ S/cm). The catalyst may be selected from commonly used transition metal-based catalysts such as Pt, Pd, Ru, Mn, Co, Ni, Fe, Cr, and their alloys, mixtures, and oxides (these are given as examples and should not be construed as limiting the scope of the present invention). Such a composite catalyst (comprising supported or unsupported catalyst particles and the ion- and electron-conductive coating material) can be attached to or coated on a porous carbon paper on one side and attached to or coated on a PEM layer on another side (FIG. 4). This ion-conductive and electron-conductive material preferably comprises a polymer, which can be a homopolymer, co-polymer, polymer blend or mixture, a semi-interpenetrating network, or a polymer alloy. In this case, one polymer component can be ion-conductive and another one electron-conductive. It is also possible that a polymer itself is conductive to both electrons and ions (e.g., protons). Examples will be given for these cases.

With this invented catalyst composition, the resulting electrode can be used as either an anode or a cathode. As shown in FIG. 4, when it is used in an anode, hydrogen gas or organic fuel can permeate to the electrode through the pores 23 or diffuse through the ion- and electron-conductive electrolyte material 44, which is ultra-thin and can be readily migrated through via diffusion. Due to its high electronic conductivity, the electrons produced at the catalyst particles 21 can be quickly transported through the electrolyte material 44 to carbon fibers 25 of a carbon paper and be collected with little resistance or resistive (Ohmic) loss. The produced protons are also capable of migrating through the invented ion- and electron-conductive electrolyte material 44 (herein after also referred to as the coating or impregnation material) into the electronically non-conductive PEM layer, which is a conventional solid electrolyte layer interposed between an anode and a cathode.

If used as a cathode catalyst material, this solid electrolyte coating material 44 allows the electrons that come from the external load to go to the catalyst particle sites where they meet with protons and oxygen gas to form water. The protons come from the anode side, through the PEM layer, and the coating material 44 to reach the catalyst sites. Oxygen gas migrates through the pores 23 or the electrolyte coating material 44 via diffusion. Again, the electrons are capable of being transported into the cathode without any significant Ohmic where $0 \leq y \leq 1$, $R_1$, $R_2$, $R_3$, $R_4$, $R_5$, and $R_6$ are independently selected from the group consisting of H, $SO_3^-$, $SO_3H$, $-R_7SO_3^-$, $-R_7SO_3H$, $-OCH_3$, $-CH_3$, $-C_2H_5$, $-F$, $-Cl$, $-Br$, $-I$, $-OH$, $-O^-$, $-SR_7$, $-OR_7$, $-COOH$, $-COOR_7$, $-COR_7$, $-CHO$, and $-CN$, wherein $R_7$ is a $C_1$-$C_8$ alkyl, aryl, or aralkyl group, and wherein the fraction of rings containing at least one $R_1$, $R_2$, $R_3$, or $R_4$ group being an $SO_3^-$, $SO_3H$, $-R_7SO_3^-$, or $-R_7SO_3H$ that varies from approximately 20% to 100%. It may be noted that this class of polymers was developed for applications that made use of their electronic properties. Due to their high electronic conductivity, these polymers cannot be used as a PEM interposed between an anode and a cathode in a fuel cell (PEM must be electronically non-conductive to avoid internal short-circuiting in a fuel cell). Hence, it is no surprise that the proton conductivity of these polymers has not been reported by Epstein, et al.

It is of interest at this juncture to re-visit the issue of ion and electron conductivities for this coating material. The proton conductivity of a conventional PEM material is typically in the range of $10^{-3}$ S/cm to $10^{-1}$ S/cm (resistivity $\rho$ of $10^1$ Ω-cm to $10^3$ Ω-cm). The thickness (t) of a PEM layer is typically in the vicinity of 100 μm and the active area is assumed to be A=100 cm². Then, the resistance to proton flow through this layer will be R=$\rho$(t/A)=$10^{-3}$ Ω to $10^{-1}$ Ω. Further assume that the resistance of the catalyst coating material (the ion- and electron-conductive material) will not add more than 10% additional resistance, then the maximum resistance of the coating layer will be $10^{-4}$ Ω to $10^{-2}$ Ω. With a coating layer thickness of 1 μm, the resistivity to proton flow cannot exceed $10^2$ Ω-cm to $10^4$ Ω-cm (proton conductivity no less than $10^{-4}$ S/cm to $10^{-2}$ S/cm). With an intended coating layer thickness of 0.1 μm (100 nm), the proton conductivity should be no less than $10^{-5}$ S/cm to $10^{-3}$ S/cm.

Similar arguments may be used to estimate the required electronic conductivity of the coating layer. Consider that the electrons produced at the catalyst surface have to pass through a coating layer (0.1 μm or 100 nm thick) and a carbon paper layer (100 μm in thickness with average transverse conductivity of $10^{-1}$ S/cm to $10^{+1}$ S/cm). A reasonable requirement is for the coating layer to produce a resistance to electron flow that is comparable to 10% of the carbon paper resistance. This implies that the electronic conductivity of the coating material should be in the range of $10^{-3}$ S/cm to $10^{-1}$ S/cm. These values can be increased or decreased if the coating thickness is increased or decreased. It may be further noted that conventional PEM materials have an electronic conductivity in the range of $10^{-16}$-$10^{-13}$ S/cm, which could produce an enormous power loss.

We therefore decided to investigate the feasibility of using sulfonated polyaniline (S-PANi) materials as a component of an electro-catalyst material. After an extensive study, we have found that the most desirable compositions for use in practicing the present invention are for $R_1$, $R_2$, $R_3$, and $R_4$ group in Formula I being H, $SO_3^-$ or $SO_3H$ with the latter two varied between 30% and 75% (degree of sulfonation between 30% and 75%). The proton conductivity of these $SO_3^-$ or $SO_3H$-based S-PANi compositions increases from $3\times10^{-3}$ S/cm to $4\times10^{-2}$ S/cm and their electron conductivity decreases from 0.5 S/cm to 0.1 S/cm when the degree of sulfonation is increased from approximately 30% to 75% (with y being approximately 0.4-0.6). These ranges of ion and proton conductivities are reasonable, particularly when one realizes that only a very thin film of S-PANi is used (typically much thinner than 1 μm and can be as thin as nanometers). A polymer of this nature can be used alone as an ion- and electron-conductive material. We have further found that these polymers are soluble in a wide range of solvents and are chemically compatible (miscible and mixable) with the commonly used proton-conductive polymers such as those represented by Formula IV-VII, to be described later. Hence, these S-PANi polymers also can be used in combination with an ion- (proton-) conductive polymer to coat the electro-catalyst particles.

The aforementioned class of S-PANi was prepared by sulfonating selected polyaniline compositions after polymer synthesis. A similar class of soluble aniline polymer could be prepared by polymerizing sulfonic acid-substituted aniline monomers. The synthesis procedures are similar to those suggested by Shimizu, et al. (U.S. Pat. No. 5,589,108, Dec. 31, 1996). The electronic conductivity of this class of material was found by Shimizu, et al. to be between 0.05 S/cm and 0.2 S/cm, depending on the chemical composition. However, proton conductivity was not measured or reported by Shimizu, et al. We have found that the proton conductivity of this class of polymers typically ranges from $4\times10^{-3}$ S/cm to $5\times10^{-2}$ S/cm, depending on the degree of sulfonation. It appears that both ion (proton) and electron conductivities of these polymers are well within acceptable ranges to serve as an ion- and electron-conductive polymer for use in the presently invented fuel cell catalyst compositions. Again, these polymers are soluble in a wide range of solvents and are chemically compatible (miscible and mixable) with commonly used proton-conductive polymers such as those represented by Formula IV-VII, to be described later. Hence, these polymers not only can be used alone as an ion- and electron-conductive polymer, but also can be used an electron-conductive polymer component that forms a mixture with a proton-conductive polymer.

The needed ion- and electron-conducting coating polymer can be a mixture or blend of an electrically conductive polymer and an ion-conductive polymer with their ratio preferably between 20/80 to 80/20. The electron-conductive polymer component can be selected from any of the π electron conjugate chain polymers, doped or un-doped, such as derivatives of polyaniline, polypyrrole, polythiophene, polyacetylen, and polyphenylene provided they are melt- or solution-processable. A class of soluble, electron-conductive polymers that can be used in the present invention has a bi-cyclic chemical structure represented by Formula II:

(Formula II)

wherein $R_1$ and $R_2$ independently represent a hydrogen atom, a linear or branched alkyl or alkoxy group having 1 to 20 carbon atoms, a primary, secondary or tertiary amino group, a trihalomethyl group, a phenyl group or a substituted phenyl group, X represents S, O, Se, Te or $NR_3$, $R_3$ represents a hydrogen atom, a linear or branched alkyl group having 1 to 6 carbon atoms or a substituted or unsubstituted aryl group, providing that the chain in the alkyl group of $R_1$, $R_2$, or $R_3$, or in the alkoxy group of $R_1$ or $R_2$ optionally contains a carbonyl, ether or amide bond, M represents $H^+$, an alkali metal ion such as $Na^+$, $Li^+$, or $K^+$ or a cation such as a quaternary ammonium ion, and m represents a numerical value in the range between 0.2 and 2. This class of polymers was developed for the purpose of improving solubility and processability of electron-conductive polymers (Saida, et al., U.S. Pat. No. 5,648,453, Jul. 15, 1997). These polymers are also soluble in a wide range of solvents (including water) and are chemically compatible (miscible and mixable) with the proton-conductive polymers represented by Formula IV-VII, to be described later. These polymers exhibit higher electronic conductivity when both $R_1$ and $R_2$ are H, typically in the range of $5\times10^{-2}$ S/cm to 1.4 S/cm. These polymers are also proton-conductive (proton conductivity of $5\times10^{-4}$ S/cm to $1.5\times10^{-2}$ S/cm) and hence can be used in the presently invented catalyst composition, alone or in combination with another ion-conductive or electron-conductive polymer.

Polymers which are soluble in water and are electronically conductive may be prepared from a monomer that has, as a repeat unit, a thiophene or pyrrole molecule having an alkyl group substituted for the hydrogen atom located in the beta position of the thiophene or pyrrole ring and having a surfactant molecule at the end of the alkyl chain (Aldissi, et al., U.S. Pat. No. 4,880,508, Nov. 14, 1989):

(Formula III)

In these polymers, the monomer-to-monomer bonds are located between the carbon atoms which are adjacent to X, the sulfur or nitrogen atoms. The number (m) of carbon atoms in the alkyl group may vary from 1 to 20 carbon atoms. The surfactant molecule consists of a sulfonate group ($Y=SO_3$), or a sulfate group ($Y=SO_4$), or a carboxylate group ($Y=CO_2$), and hydrogen (A=H) or an alkali metal (A=Li, Na, K, etc.). Synthesis of these polymers may be accomplished using the halogenated heterocyclic ring compounds 3-halothiophene or 3-halopyrrole as starting points; these are available from chemical supply houses or may be prepared by method known to those skilled in the art. The electronic conductivity of these polymers is typically in the range of $10^{-3}$ S/cm to 50 S/cm.

The ion- or proton-conductive polymer can be any polymer commonly used as a solid polymer electrolyte in a PEM-type fuel cell. These PEM materials are well-known in the art. One particularly useful class of ion-conductive polymers is the ion exchange membrane material having sulfonic acid groups. These materials are hydrated when impregnated with water, with hydrogen ion $H^+$ detached from sulfonic ion, $SO_3^-$. The general structure of the sulfonic acid membranes that have received extensive attention for use in fuel cells and are sold under the trade name Nafion® by E. I. du Pont Company is as follows:

(Formula IV)

where x and y are integers selected from 1 to 100,000, preferably from 1 to 20,000, most preferably from 100 to 10,000. A similar polymer that is also suitable for use as a PEM is given as:

(Formula V)

Sulfonic acid polymers having a shorter chain between the pendant functional group (side group) and the main polymer backbone absorb less water at a given concentration of functional group in the polymer than do polymers having the general structure as shown by Formula IV and V. The concentration of functional group in the dry polymer is expressed as an equivalent weight. Equivalent weight is defined, and conveniently determined by standard acid-base titration, as the formula weight of the polymer having the functional group in the acid form required to neutralize one equivalent of base. In a more general form, this group of proton-conducting polymers may be represented by the formula:

(Formula VI)

where x and y are integers selected from 1 to 100,000, m is an integer selected from 0 to 10 and R is a functional group selected from the group consisting of H, F, Cl, Br, I, and $CH_3$.

Another class of PEM polymer suitable for use as an ion-conductive polymer in the present invention is characterized by a structure having a substantially fluorinated backbone which has recurring pendant groups attached thereto and represented by the general formula:

$$-O(CFR'_f)_b-(CFR_f)_a-SO_3H \qquad \text{(Formula VII)}$$

where a=0-3, b=0-3, a+b =at least 1, $R_f$ and $R'_f$ are independently selected from the group consisting of a halogen and a substantially fluorinated alkyl group having one or more carbon atoms.

The above polymers have a detachable hydrogen ion (proton) that is weakly attached to a counter-ion (e.g., $SO_3^-$), which is covalently bonded to a pendant group of the polymer. While the general structures shown above are representative of several groups of polymers of the present invention, they are not intended to limit the scope of the present invention. It would become obvious to those skilled in the art, from the relationships presented herein that other sulfonic acid functional polymers having pendant chains, sterically hindered sulfonate groups or the like would absorb some water and conduct protons. For instance, the derivatives and copolymers of the aforementioned sulfonic acid polymers, alone or in combination with other polymers to form polymer blends, may also be used as an ion-conductive material in the invented fuel cell catalyst composition. The aforementioned polymers were cited as examples to illustrate the preferred mode of practicing the present invention. They should not be construed as limiting the scope of the present invention.

In summary, the ion- or proton-conducting polymer component of the desired mixture may be selected from the group consisting of poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chlorotrifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends and combinations thereof. These materials have been used as solid electrolyte materials for various PEM-based fuel cells due to their relatively good proton conductivity (typically between 0.1 S/cm and 0.001 S/cm).

Any of these ion-conductive materials can be mixed with an electron-conductive polymer to make a polymer blend or mixture that will be conductive both electronically and ionically. Such a mixture is prepared preferably by dissolving both the ion-conductive polymer and the electron-conductive polymer in a common solvent to form a polymer solution. Catalyst particles are then added to this polymer solution to form a suspension. Alternatively, catalyst particles may be dispersed in a liquid to obtain a suspension, which is then poured into the polymer solution to form a precursor composite catalyst composition. Nano-scaled catalyst particles may be selected from commonly used transition metal-based catalysts such as Pt, Pd, Ru, Mn, Co, Ni, Fe, Cr, and their alloys or mixtures. They are commercially available in a fine powder form or in a liquid with these nano-scaled particles dispersed therein. Other types of catalyst, including oxides of transition metals and organo-metallic compound, may be used as a component in the presently invented precursor composite electro-catalyst composition provided that they or their precursors can be dissolved or dispersed in a liquid. Mixing between an ion-conductive polymer and an electron-conductive polymer may also be accomplished by melt mixing or melt extrusion.

A suspension can be prepared in this manner to contain only an ion-conductive and proton-conductive polymer (or a mixture of two or three polymers) dissolved or dispersed in a solvent. Such a catalyst-free suspension is also a useful material that can be coated to a primary surface of a carbon paper or a primary surface of a solid PEM layer. This is followed by depositing a thin film of the presently invented coated catalyst particles (composite electro-catalyst composition) from a precursor suspension onto either the carbon paper or the PEM layer. Such a catalyst-free coating serves to ensure that the coated catalysts will have a complete electronic connection with the carbon paper and complete ionic connection with the PEM layer. The resulting electrode is characterized in that the carbon black along with the supported Pt nano-particles are not surrounded by the electronically non-conductive PEM polymer after lamination to form a membrane-electrode assembly.

EXAMPLE 1

Preparation of poly(alkyl thiophene) as an Electron-Conductive Component

Water-soluble conductive polymers having a thiophene ring (X=sulfur) and alkyl groups containing 4, 6, 8, and 10 carbon atoms (m=4, 6, 8, or 10) in Formula III were prepared, according to a method adapted from Aldissi, et al. (U.S. Pat. No. 4,880,508, Nov. 14, 1989). The surfactant molecules of these polymers were sulfonate groups with sodium, hydrogen, or potassium. Conductivity of polymers of this invention in a self-doped state were from about $10^{-3}$ to about $10^{-2}$ S/cm. When negative ions from a supporting electrolyte used during synthesis were allowed to remain in the polymer, conductivities up to about 50 S/cm were observed. Conductivities of polymers without negative ions from a supporting electrolyte which were doped with vaporous sulfuric acid were about $10^2$ S/cm.

A doped poly (alkyl thiophene) (PAT) with Y=$SO_3H$ and A=H in Formula III that exhibited an electron conductivity of 12.5 S/cm was dissolved in water. A sulfonated poly(ether ether ketone)(PEEK)-based material called poly (phthalazinon ether ether ketone) (PPESK) was purchased from Polymer New Material Co., Ltd., Dalian, China. With a degree of sulfonation of approximately 93%, this polymer was soluble in an aqueous hydrogen peroxide ($H_2O_2$) solution. A water solution of 3 wt. % poly (alkyl thiophene) and an aqueous $H_2O_2$ solution of 3 wt. % sulfonated PPESK was mixed at several PPESK-to-PAK ratios and stirred at 70° C. to obtain several polymer blend solution samples.

Figure 5:
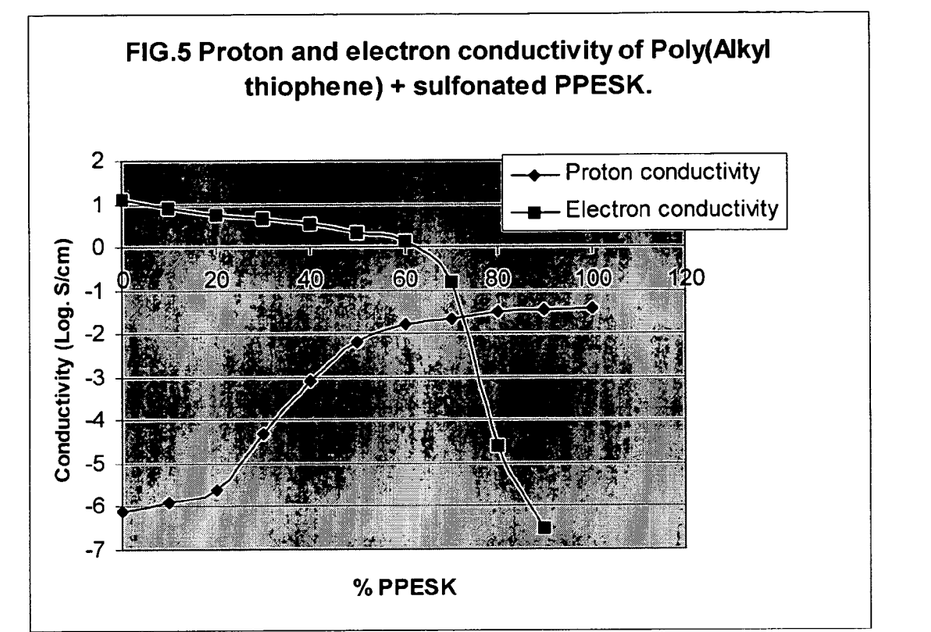
FIG. 5 The electron and proton conductivities of an ion-conductive and electron-conductive polymer mixture.

Samples of poly (alkyl thiophene)-PPESK mixtures in a thin film form were obtained by casting the aforementioned solutions onto a glass plate, allowing water to evaporate. The proton 26 and electron conductivity values of the resulting solid samples were then measured at room temperature. The results were shown in FIG. 5, which indicates that good electron and proton conductivities can be obtained within the range of 30-75% PPESK.

EXAMPLE 2

Inks (Suspensions) Containing poly(alkyl thiophene), PPESK, Carbon Black-supported Pt or Pt/Ru Carbon black-supported Pt and Pt/Ru catalyst particles were separately added and dispersed in two aqueous polymer blend solutions prepared in Example 1. The PPESK-to-PAK ratio selected in both solutions was 1:1. The viscosity of the resulting solutions (more properly referred to as suspensions or dispersions) was adjusted to vary between a tooth paste-like thick fluid and a highly dilute "ink", depending upon the amount of water used. These suspensions can be applied to a primary surface of a carbon paper or that of a PEM layer (e.g. Nafion or sulfonated PEEK sheet) via spraying, printing (ink-jet printing or screen printing), brushing, or any other coating means.

Figure 6:
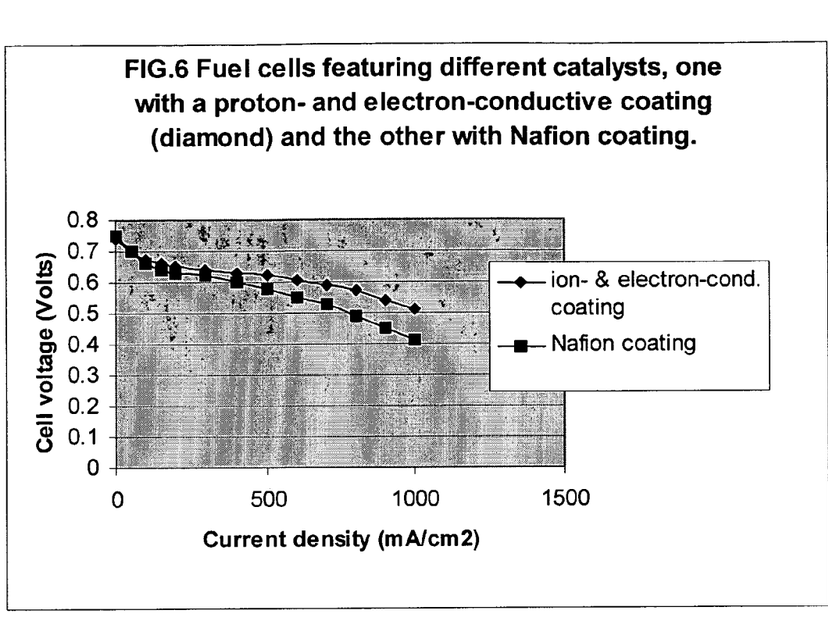
FIG. 6 The polarization curves of two fuel cells, one containing electrode catalyst particles coated with an ion- and electron-conductive polymer blend and the other containing electrode catalyst particles coated with ion-conductive (but not electron-conductive) polymer (Nafion).

A suspension comprising carbon black-supported Pt particles dispersed in an aqueous solution of PPESK and PAK was brushed onto the two primary surfaces of a Nafion sheet with the resulting catalyst-coated membrane (CCM) being laminated between two carbon paper sheets to form a membrane electrode assembly (MEA). In this case, the electrode was characterized in that the carbon black along with the supported Pt nano-particles were coated by or embedded in an ion- and electron-conductive polymer blend. A similar MEA was made that contained conventional Nafion-coated catalyst particles, wherein Nafion is only ion-conductive, but not electron-conductive. The two MEAs were subjected to single-cell polarization testing with the voltage-current density curves shown in FIG. 6. It is clear that coating the catalyst particles with an electron- and ion-conductive polymer mixture significantly increases the voltage output of a fuel cell compared with that of a conventional fuel cell with Nafion-coated catalysts. This implies a more catalyst utilization efficiency and less power loss (lesser amount of heat generated).

EXAMPLE 3

Sulfonated Polyaniline(S-PANi)

The chemical synthesis of the S-PANi polymers was accomplished by reacting polyaniline with concentrated sulfuric acid. The procedure was similar to that used by Epstein, et al. (U.S. Pat. No. 5,109,070, Apr. 28, 1992). The resulting S-PANi can be represented by Formula I with $R_1$, $R_2$, $R_3$, and $R_4$ group being H, $SO_3^-$ or $SO_3H$ with the latter two being varied between 30% and 75% (degree of sulfonation between 30% and 75%). The proton conductivity of these $SO_3^-$— or $SO_3H$-based S-PANI) compositions was in the range of $3\times10^{-3}$ S/cm to $4\times10^{-2}$ S/cm and their electron conductivity of 0.1 S/cm to 0.5 S/cm when the degree of sulfonation was from approximately 30% to 75% (with y being approximately 0.4-0.6).

Figure 7:
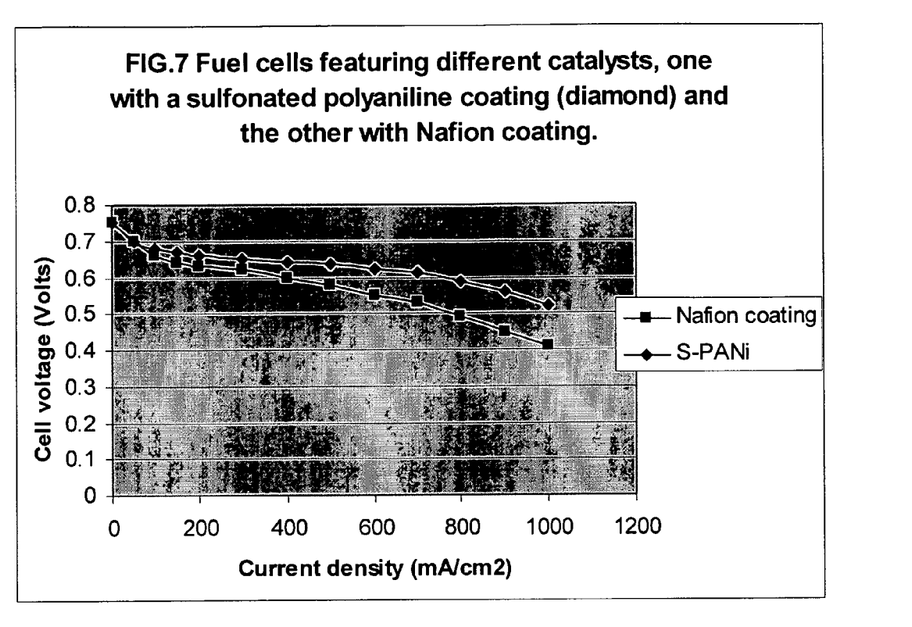
FIG. 7 The polarization curves of two fuel cells, one containing electrode catalyst particles coated with an ion- and electron-conductive polymer (sulfonated polyaniline) and the other containing electrode catalyst particles coated with ion-conductive (but not electron-conductive) polymer (Nafion).

A sample with the degree of sulfonation of about 65% was dissolved in 0.1 M $NH_4OH$ up to approximately 20 mg/ml. A small amount of carbon-supported Pt was added to the S-PANi solution to obtain a suspension that contained approximately 5% by volume of solid particles. The suspension was sprayed onto the two primary surfaces of a Nafion sheet with the resulting catalyst-coated membrane (CCM) being laminated between two carbon paper sheets to form a membrane electrode assembly (MEA). Prior to this lamination step, one surface of the carbon paper, the one facing the catalyst, was pre-coated with a thin layer of S-PANi via spraying of the S-PANi solution onto the paper surface and allowing the solvent to evaporate under a chemical fume hood. The resulting electrode was characterized in that the carbon black along with the supported Pt nano-particles were coated by or embedded in an ion- and electron-conductive polymer. The electrode was also porous, providing channels for fuel or oxidant transport. A similar MEA was made that contained conventional Nafion-coated catalyst particles, wherein Nafion is only ion-conductive, but not electron-conductive. The two MEAs were subjected to single-cell polarization testing with the voltage-current density curves shown in FIG. 7. These results demonstrate that coating the catalyst particles with an electron- and ion-conductive polymer significantly increases the voltage output of a fuel cell compared with that of a conventional fuel cell with Nafion-coated catalysts.

EXAMPLE 4

Bi-cyclic Conducting Polymers

The preparation of conductive polymers represented by Formula II having H for both $R_1$ and $R_2$, S for X, and $H^+$ for M was accomplished by following a procedure suggested by Saida, et al. (U.S. Pat. No. 5,648,453, Jul. 15, 1997). These polymers exhibit electronic conductivity in the range of $5 \times 10^{-2}$ S/cm to 1.4 S/cm and proton conductivity of $5 \times 10^{-4}$ S/cm $1.5 \times 10^{-2}$ S/cm.

Six polymer blends were prepared from such a bi-cyclic polymer (electron conductivity $\sigma_e = 1.1$ S/cm and proton conductivity $\sigma_p = 3 \times 10^{-3}$ S/cm) and approximately 50% by wt. of the following proton-conductive polymers: poly(perfluoro sulfonic acid) (PPSA), sulfonated PEEK (S-PEEK), sulfonated polystyrene (S-PS), sulfonated PPSEK, sulfonated polyimide (S-PI), and sulfonated polyaniline (S-PANi). The conductivities of the resulting polymer blends are $\sigma_e = 0.22$ S/cm and $\sigma_p = 2 \times 10^{-2}$ S/cm for (bi-cyclic+PPSA), $\sigma_e = 0.2$ S/cm and $\sigma_p = 7 \times 10^{-3}$ S/cm for (bi-cyclic+S-PEEK), $\sigma_e = 0.23$ S/cm and $\sigma_p = 5.5 \times 10^{-3}$ S/cm for (bi-cyclic+S-PS), $\sigma_e = 0.19$ S/cm and $\sigma_p = 6 \times 10^{-3}$ S/cm for (bi-cyclic+S-PPSEK), $\sigma_e = 0.21$ S/cm and $\sigma_p = 7.5 \times 10^{-3}$ S/cm for (bi-cyclic+S-PI), and $\sigma_e = 0.75$ S/cm and $\sigma_p = 3 \times 10^{-3}$ S/cm for (bi-cyclic+S-PANi), These conductivity values are all within the acceptable ranges for these polymer blends to be a good coating material for the catalyst particles in a fuel cell electrode.

What is claimed:

1. An electro-catalyst composition for use in a fuel cell, said composition comprising:
   (a) a catalyst un-supported or supported on an electronically conducting solid carrier; and
   (b) an ion-conductive and electron-conductive coating material in physical contact with said catalyst, coated on said catalyst, and/or coated on a surface of said carrier, wherein said coating material has an electronic conductivity no less than $10^{-4}$ S/cm and ion conductivity no less than $10^{-5}$ S/cm.

2. The electro-catalyst as defined in claim 1, wherein said electronic conductivity is no less than $10^{-2}$ S/cm and said ion conductivity is no less than $10^{-3}$ S/cm.

3. The electro-catalyst as defined in claim 1, wherein said coating material comprises a proton-conducting polymer.

4. The electro-catalyst as defined in claim 3, wherein said proton-conducting polymer is selected from the group consisting of poly(perfluoro sulfonic acid), sulfonated polytetrafluoroethylene, sulfonated perfluoroalkoxy derivatives of polytetrafluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends and combinations thereof.

5. The electro-catalyst as defined in claim 4, further comprising an electronically conducting polymer which forms a polymer blend with said ion-conducting polymer.

6. The electro-catalyst as defined in claim 1, wherein said coating material comprises an electrically conducting polymer.

7. The electro-catalyst as defined in claim 1, wherein said coating material comprises an electrically conducting polymer selected from the group consisting of sulfonated polyaniline, sulfonated polypyrrole, sulfonated poly thiophene, sulfonated bi-cyclic polymers, their derivatives, and combinations thereof.

8. The electro-catalyst as defined in claim 1, wherein said coating material comprises a mixture of an ion-conducting polymer and an electron-conducting polymer.

9. The electro-catalyst as defined in claim 1, wherein said coating material comprises an ion-conducting polymer which is also electronically conducting.

10. The electro-catalyst as defined in claim 1, wherein said coating material comprises an ion-conducting and/or electron-conducting polymer and said catalyst or both said catalyst and its supporting solid carrier is embedded in said polymer.

11. A precursor electro-catalyst composition comprising:
    (a) a catalyst dissolved or dispersed in a liquid medium; and
    (b) an ion-conducting and electron-conducting polymer dissolved or dispersed in said liquid medium, wherein an electronic conductivity of said polymer, when measured in a solid state, is no less than $10^{-4}$ S/cm and ion conductivity of said polymer, when measured in a solid state, is no less than $10^{-5}$ S/cm.

12. The precursor electro-catalyst composition as defined in claim 11 further comprising a carrier carbon material for supporting said catalyst, wherein said catalyst comprises a transition metal element.

13. The precursor electro-catalyst composition as defined in claim 11 wherein said said polymer comprises a proton-conducting polymer selected from the group consisting of poly(perfluoro sulfonic acid), sulfonated polytetrafluoroethylene, sulfonated perfluoroalkoxy derivatives of polytetrafluoroethylene, sulfonated polysulfone, sulfonated poly (ether ketone), sulfonated poly (ether ether ketone), sulfonated polyimide, sulfonated styrene-butadiene copolymers, sulfonated polychlorotrifluoroethylene, sulfonated perfluoroethylene-propylene copolymer, sulfonated ethylene-chlorotrifluoroethylene copolymer, sulfonated polystyrene, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, their chemical derivatives, copolymers, blends, and combinations thereof.

14. The precursor electro-catalyst composition as defined in claim 11, wherein said polymer comprises an electronically conducting polymer.

15. The precursor electro-catalyst composition as defined in claim 11, wherein said polymer comprises an electrically conducting polymer selected from the group consisting of sulfonated polyaniline, sulfonated polypyrrole, sulfonated poly thiophene, sulfonated bi-cyclic polymers, their derivatives, and combinations thereof.

16. A fuel cell electrode comprising an electro-catalyst composition defined in claim 1.

17. A fuel cell membrane-electrode assembly comprising an electro-catalyst composition defined in claim 1.

18. A fuel cell comprising an electro-catalyst composition defined in claim 1.

19. The fuel cell membrane electrode assembly as defined in claim 17, further comprising a porous catalyst backing layer with a primary surface coated with an ion-conductive and electron-conductive material which is in electronic contact with said electro-catalyst composition.

20. The fuel cell membrane electrode assembly as defined in claim 19 wherein said porous catalyst backing layer comprises a carbon paper or carbon cloth.

* * * * *